US006363595B1

(12) United States Patent
Roy

(10) Patent No.: US 6,363,595 B1
(45) Date of Patent: Apr. 2, 2002

(54) CUE TIP INSTALLATION APPARATUS

(76) Inventor: Henry Roy, 5599 Dover Cir., Frederick, MD (US) 21703-7565

( * ) Notice: Subject to any disclaimer, the term of this patent is extended or adjusted under 35 U.S.C. 154(b) by 0 days.

(21) Appl. No.: 09/360,856

(22) Filed: Jul. 24, 1999

Related U.S. Application Data

(60) Provisional application No. 60/095,024, filed on Aug. 3, 1998.

(51) Int. Cl.[7] .................................... B23P 19/04

(52) U.S. Cl. .................................... 29/263; 29/257

(58) Field of Search .................... 29/263, 260, 259, 29/257, 256

(56) References Cited

U.S. PATENT DOCUMENTS 165,562 A * 7/1875 Gravelius .................... 29/263

* cited by examiner

*Primary Examiner*—Robert C. Watson

(57) ABSTRACT

A cue tip installation apparatus is provided comprising a clamp frame having a top portion that includes a threaded screw ram reception channel, and another portion that includes a pair of clamp wings. A cue reception channel is located between the clamp wings and is in alignment with the screw ram reception channel. A screw ram is received in the screw ram reception channel. More specifically, the screw ram includes a threaded screw shaft that is received in the screw ram reception channel. A handle is connected to one end of the screw shaft for driving the screw shaft, and a tip compression head is attached to another end of the screw shaft. The clamp wings include threaded clamp screw reception channels and at least one threaded clamp screw causing the clamp wings to laterally engage the tip of a pool cue and facilitate installation of cue tips onto the end the pool cue stick by operation of the screw ram.

16 Claims, 6 Drawing Sheets

FIG 8
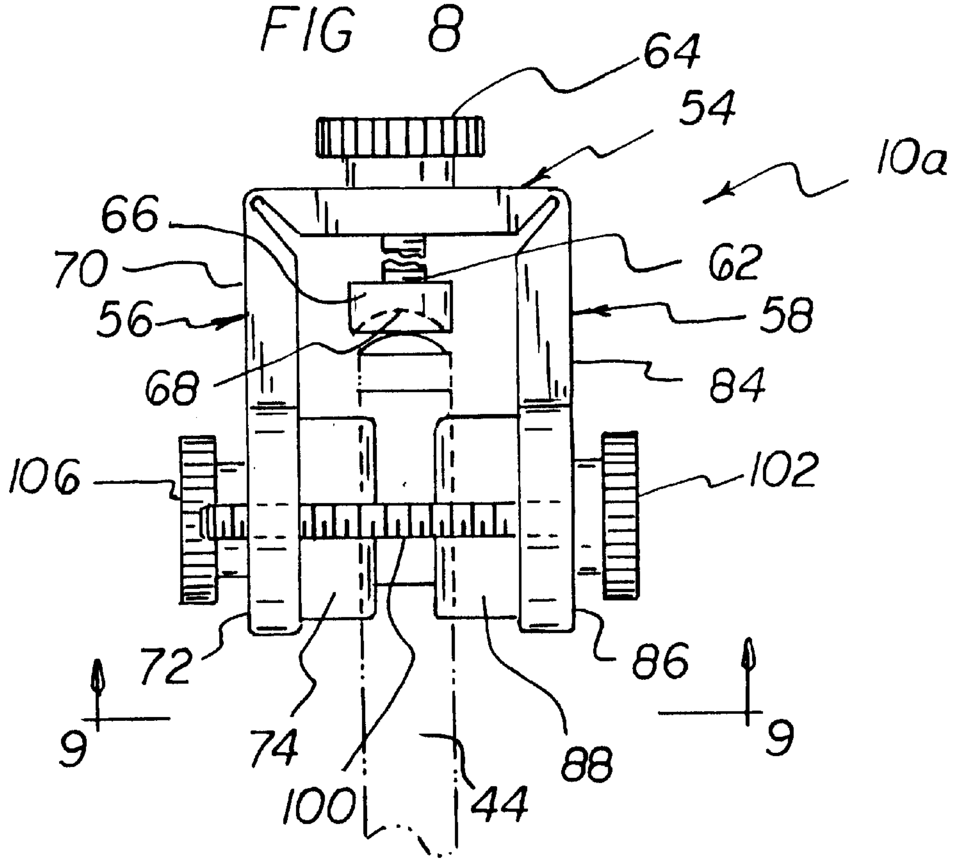
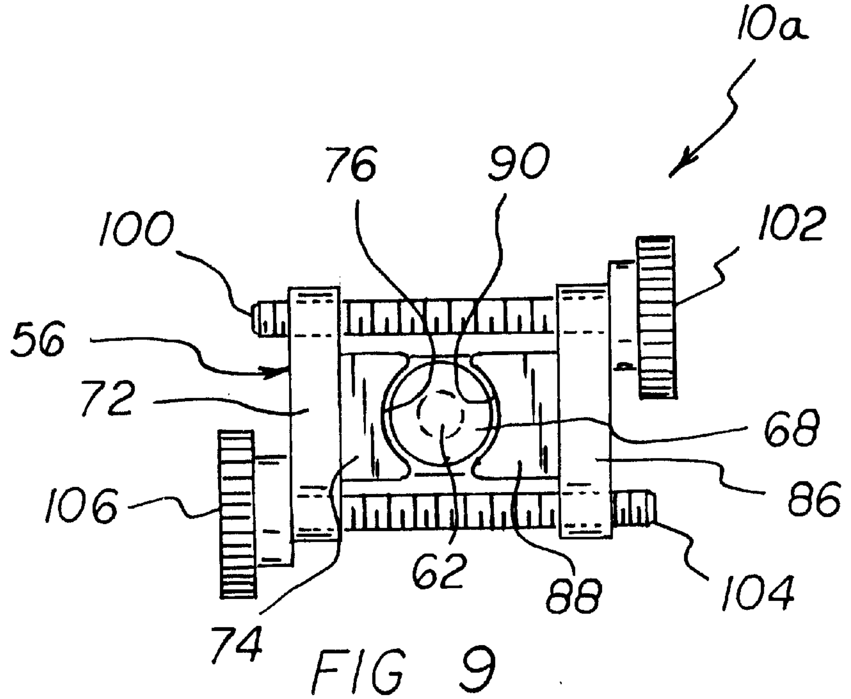
FIG 9

FIG 10
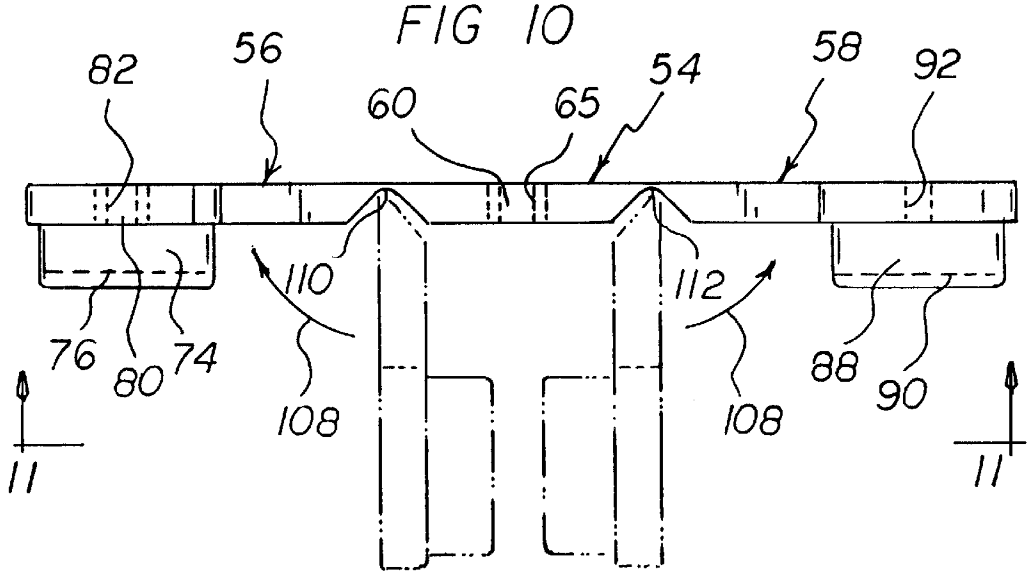
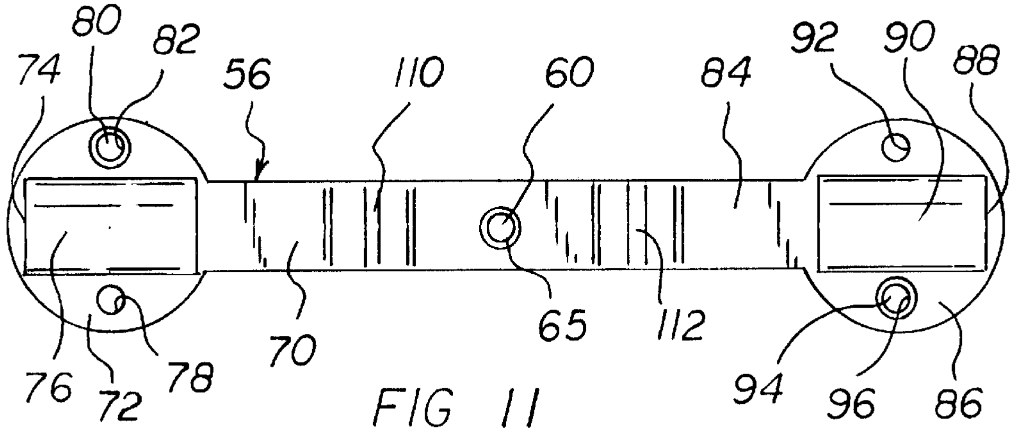
FIG 11

CUE TIP INSTALLATION APPARATUS

CROSS-REFERENCE TO RELATED APPLICATION

This application claims priority based upon my copending Provisional Application Ser. No. 60/095,024, filed Aug. 3, 1998.

BACKGROUND OF THE INVENTION

1. Field of the Invention

The present invention relates generally to the field of the games of pool and billiards and, more particularly, to cue sticks used in pool and billiards.

2. Description of the Prior Art

When a cue stick has been in use for a period of time, it is often desirable or necessary to replace the tip of the cue stick. In a conventional approach to replacing a cue tip, a two-piece tool set is often employed which employs slide compression on the front end of the cue stick shaft. Employing such slide compression can damage or remove finish or scar the shaft of the cue stick. In this respect, it would be desirable if a device were provided that does not employ slide compression for installing a cue tip onto a cue stick.

Still other features would be desirable in a cue tip installation apparatus. For example, it would be desirable if a single cue tip installation apparatus could be provided that can be employed for installing different size and different weight cue tips. In addition, to ensure accurate placement of a cue tip onto a cue stick, it would be desirable if a cue tip installation apparatus were provided that maintained installation components in proper alignment during the installation process.

If desired, to stabilize a cue tip installation apparatus, it would be desirable if the cue tip installation apparatus could be attached to a stable support and could be used during attachment to the stable support.

Thus, while the foregoing indicates it to be well known to use a device for attaching a cue tip to a cue stick, the foregoing does not teach or suggest a cue tip installation apparatus which has the following combination of desirable features: (1) does not employ slide compression for installing a cue tip onto a cue stick; (2) can be employed for installing different size and different weight cue tips; (3) maintains installation components in proper alignment during the installation process; (4) can be attached to a stable support and can be used during attachment to the stable support; and (5) achieves a compact lightweight apparatus facilitating easy removal of a pool cue after tip installation.

The foregoing desired characteristics are provided by the unique cue tip installation apparatus of the present invention as will be made apparent from the following description thereof. Other advantages of the present invention over the prior art also will be rendered evident

SUMMARY OF THE INVENTION

To achieve the foregoing and other advantages, the present invention, briefly described, provides a cue tip installation apparatus which comprises a clamp frame having a top portion that includes a threaded screw ram reception channel, and another portion that includes a pair of clamp wings. A cue reception channel is located between the clamp wings and is in alignment with the screw ram reception channel. A screw ram is received in the screw ram reception channel. More specifically, the screw ram includes a threaded screw shaft that is received in the screw ram reception channel. A handle is connected to one end of the screw shaft for driving the screw shaft, and a tip compression head is attached to another end of the screw shaft. The clamp wings include threaded clamp screw reception channels and at least one threaded clamp screw causing the clamp wings to laterally engage the tip of a pool cue and facilitate installation of cue tips onto the end the pool cue stick by operation of the screw ram.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cue tip installation apparatus which has all of the advantages of the prior art and none of the disadvantages.

It is another object of the present invention to provide a new and improved cue tip installation apparatus which may be easily and efficiently manufactured and marketed.

It is a further object of the present invention to provide a new and improved cue tip installation apparatus which is of durable and reliable construction.

An even further object of the present invention is to provide a new and improved cue tip installation apparatus which is susceptible of a low cost of manufacture with regard to both materials and labor, and which accordingly is then susceptible of low prices of sale to the consuming public, thereby making such cue tip installation apparatus available to the buying public.

Still yet a further object of the present invention is to provide a new and improved cue tip installation apparatus which does not employ slide compression for installing a cue tip onto a cue stick.

Still another object of the present invention is to provide a new and improved cue tip installation apparatus that can be employed for installing different size and different weight cue tips.

Yet another object of the present invention is to provide a new and improved cue tip installation apparatus which maintains installation components in proper alignment during the installation process.

Even another object of the present invention is to provide a new and improved cue tip installation apparatus that can be attached to a stable support and can be used during attachment to the stable support.

Yet another object of the invention is to provide a new and improved cue tip installation apparatus that is compact and lightweight and facilitates easy removal of a pool cue after tip installation.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 8 is a front view of the alternatively preferred embodiment of the cue tip installation apparatus of FIG. 7 taken along line 8—8 thereof.

FIG. 9 is a bottom view of the alternatively preferred embodiment of the cue tip installation apparatus of FIG. 8 taken along line 9—9 thereof.

FIG. 10 is an unfolded elevational view of a portion of the alternatively preferred embodiment of the invention shown in FIGS. 6–9.

FIG. 11 is a bottom view of the alternatively preferred embodiment of the cue tip installation apparatus of FIG. 10 taken along line 11—11 thereof.

DESCRIPTION OF THE PREFERRED EMBODIMENT

Figure 1:
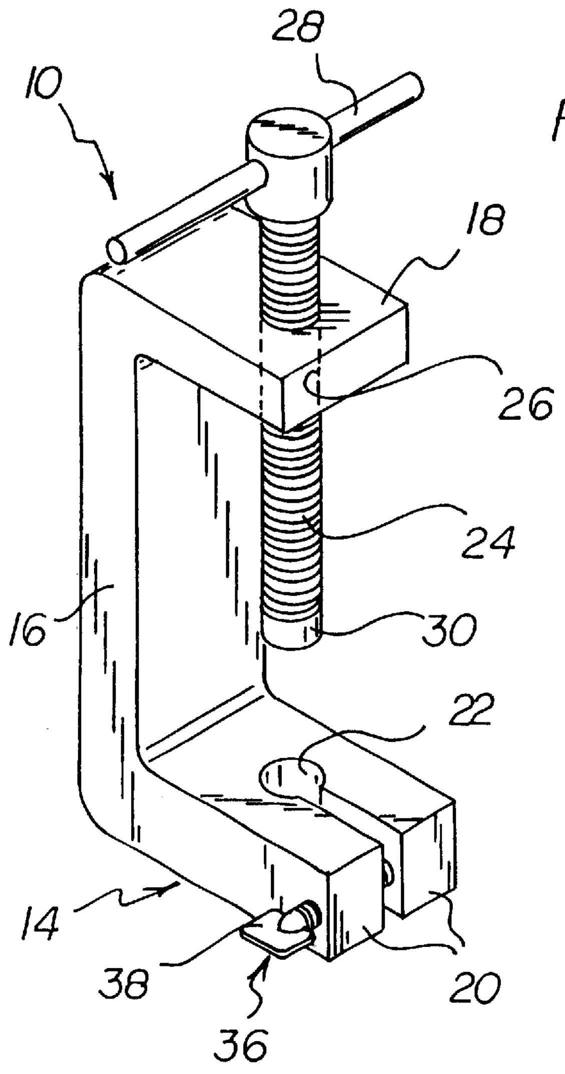
FIG. 1 is a perspective view showing a preferred embodiment of the cue tip installation apparatus of the invention.
Figure 2:
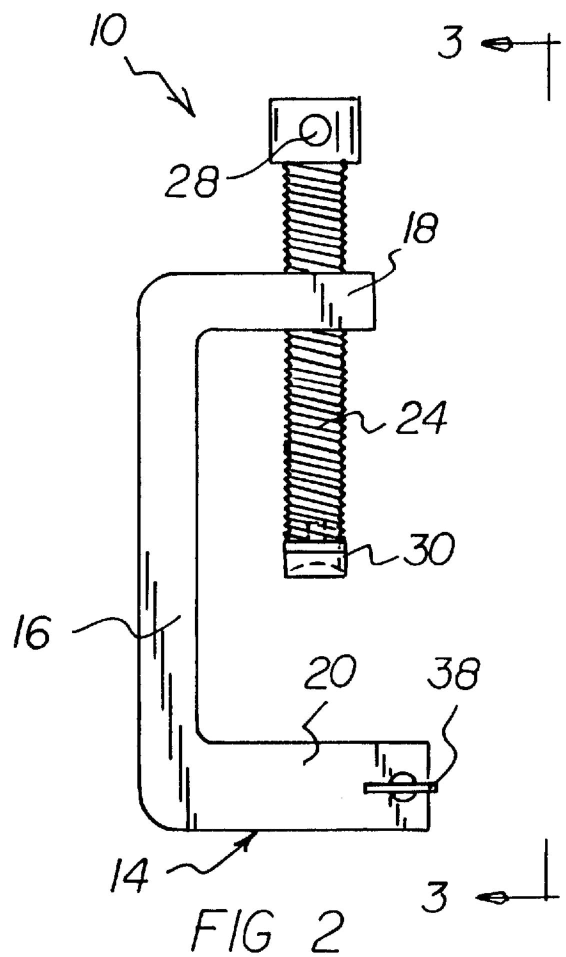
FIG. 2 is a side view of the embodiment of the cue tip installation apparatus shown in FIG. 1.
Figure 3:
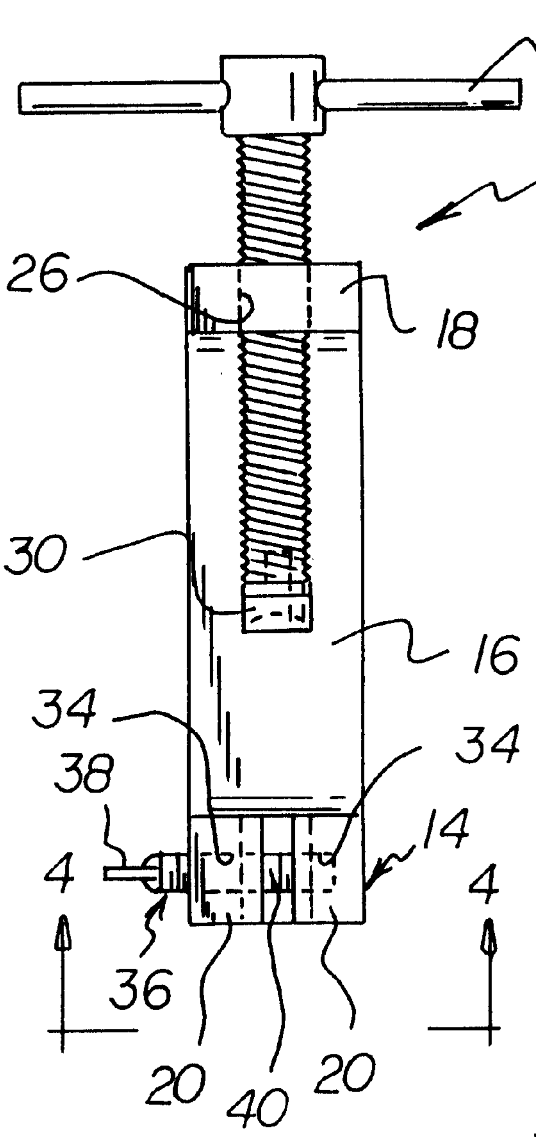
FIG. 3 is a front view of the embodiment of the cue tip installation apparatus of FIG. 2 taken along line 3—3 thereof.
Figure 4:
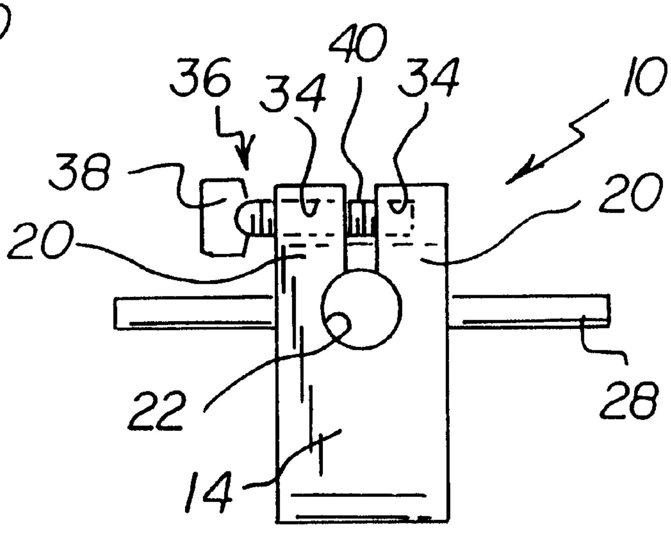
FIG. 4 is a bottom view of the embodiment of the cue tip installation apparatus of FIG. 3 taken along line 4—4 thereof.

With reference to the drawings, a new and improved cue tip installation apparatus embodying the principles and concepts of the present invention will be described.

Turning to FIGS. 1–5, there is shown an exemplary embodiment of the cue tip installation apparatus of the invention generally designated by reference numeral 10. In its preferred form, cue tip installation apparatus 10 comprises a clamp frame which includes a frame bottom portion 14, a frame riser portion 16 extending upward from the frame bottom portion 14, and a frame top portion 18 extending transversely with respect to the frame riser portion 16. The frame bottom portion 14 also extends transversely with respect to the frame riser portion 16 and is parallel to the frame top portion 18. The frame top portion 18 includes a threaded screw ram reception channel 26, and the frame bottom portion 14 includes a pair of clamp wings 20. A cue reception channel 22 is located between the clamp wings 20 and is in alignment with the screw ram reception channel 26. A screw ram is received in the screw ram reception channel 26. More specifically, the screw ram includes a threaded screw shaft 24 that is received in the screw ram reception channel 26. A handle 28 is connected to one end of the screw shaft 24 for driving the screw shaft 24, and a tip compression head 30 is attached to another end of the screw shaft 24. A wing clamp clamps the clamp wings 20 together.

The clamp wings 20 include threaded clamp screw reception channels 34, and the wing clamp includes a threaded clamp screw 36 received in the clamp screw reception channels 34. The clamp screw 36 includes a threaded clamp screw shaft portion 40 and a clamp screw handle portion 38 for driving the clamp screw shaft portion 40.

Figure 5:
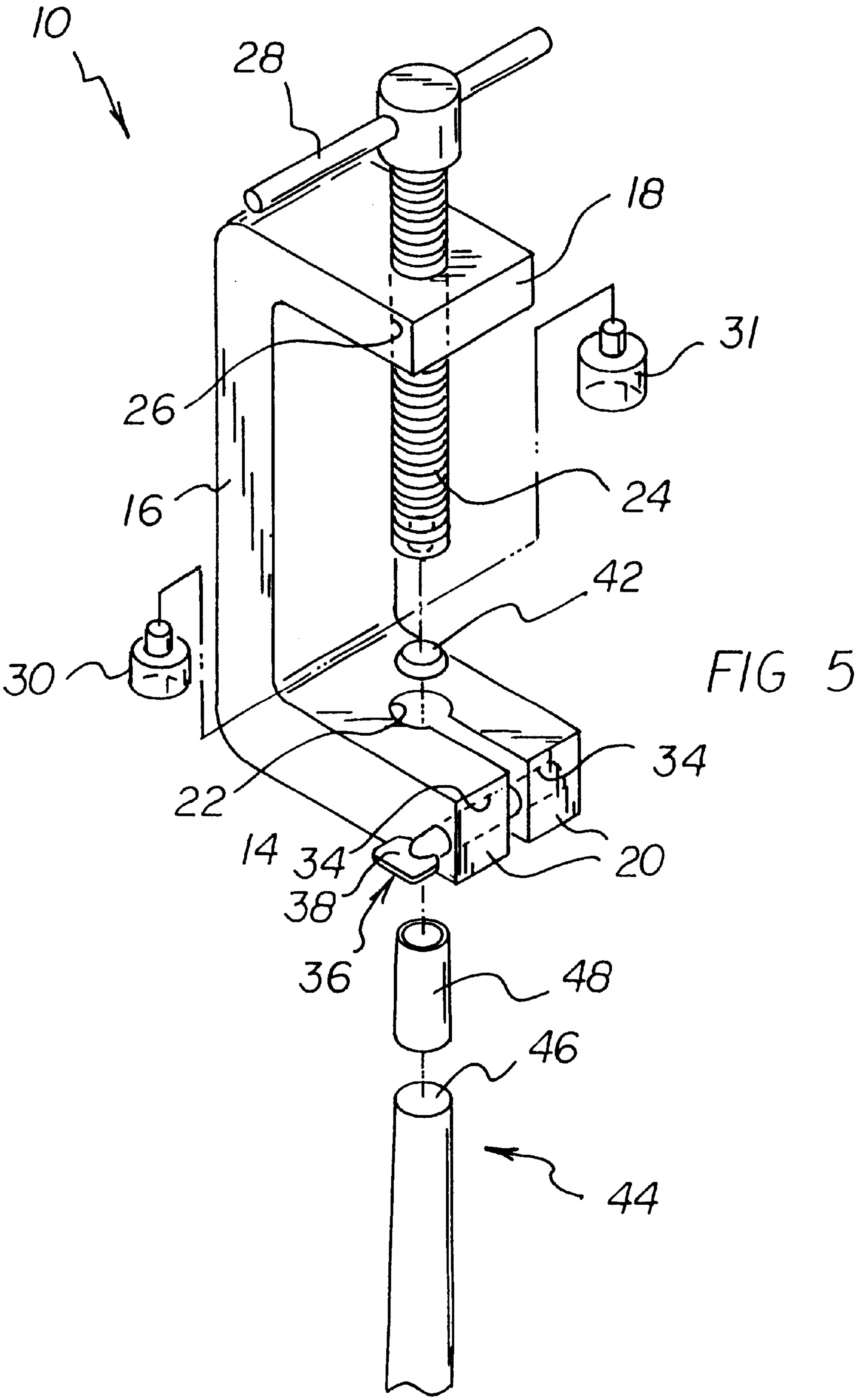
FIG. 5 is an exploded perspective view of the embodiment of the invention shown in FIG. 1.

To use the cue tip installation apparatus 10 for installing a cue tip 42 on a pool cue 44, the end of the pool cue 44 onto which the cue tip 42 will be installed is first cleaned. The back side of the cue tip 42 to be installed is lightly sanded. A light coat of adhesive is placed on the back side of the cue tip 42, and a light coat of adhesive is placed on the cue stick end 46. The adhesives are allowed to set for approximately three minutes. A damp cloth is used to wipe excess adhesive off of the sides of the plastic ferrule 48 which is on the pool cue 44 adjacent to the cue stick end 46. Ferrules range in size from 11 mm. to 15 mm. The tip compression head 30 is inserted into the end of the screw shaft 24. The tip compression head 30 has a size in a range of 11 mm. to 15 mm. The plastic ferrule 48 portion of the pool cue 44 is placed in the cue reception channel 22, and the clamp screw handle portion 38 is turned to turn the clamp screw shaft portion 40 to tighten the clamp wings 20 onto the plastic ferrule 48. Then, the cue tip 42 is placed on the cue stick end 46 of the pool cue 44. The handle 28 is turned so that the tip compression head 30 presses the cue tip 42 onto the cue stick end 46. Only a slight pressure is applied. The pressure of the tip compression head 30 on the cue tip 42 is maintained until the adhesive sets. After the adhesive sets, the clamp screw shaft portion 40 is turned to loosen the grip of the clamp wings 20 on the plastic ferrule 48. Then, the pool cue 44 with the attached cue tip 42 is removed from the cue tip installation apparatus 10. Once the pool cue 44 is removed from the apparatus, the cue tip 42 can be sanded, formed, and finished. A number of tip compression heads 30 can be provided to accommodate different cue tips 42. For example, FIG. 5 illustrates a first tip compression head 30 and a second tip compression head 31 that can be used alternatively.

If desired, the cue tip installation apparatus 10 of the invention could be attached to a stable support, such as a table or bench, and could be used for attaching a cue tip to a cue stick while the apparatus is attached to the stable support.

Turning to FIGS. 6–11, there is shown an alternatively preferred exemplary embodiment of the cue tip installation apparatus of the invention generally designated by reference numeral **10*a*. In its preferred form, cue tip installation apparatus 10*a* comprises a clamp frame which includes a frame top portion 54, a first frame riser portion 56 extending downward from the frame top portion 54 at one thereof, and a second frame riser portion 58 extending downward from the frame top portion at the other opposed end thereof. In the assembled, operative position (FIGS. 6–9), the first fame riser portion 56 and the second frame riser portion 58 extend generally parallel to each other and perpendicular to the frame top portion 54 and are of similar shape, size and extent. By this arrangement, the clamp frame forms what might be described generally as an in inverted U-shaped clamp frame member (FIG. 8**). This is in contrast to the first described embodiment where the clamp frame forms what might be described generally as a C-shaped clamp frame member.

The frame top portion 54 includes a threaded screw ram reception channel 60 substantially centrally located thereon. A screw ram is received in the screw ram reception channel 26 coaxially to the imaginary central axis defined by the screw reception channel 60. More specifically, the screw ram includes a threaded screw shaft 62 that is received in the screw ram reception channel 60. A handle 64 is connected to one end of the screw shaft 62 for axially advancing or backing-off the screw shaft 62, and a cue tip compression head 66 is attached to another distal end of the screw shaft 62. The cue tip compression head has a suitable concave bottom surface 68 for engaging the top surface of a cue tip. A first screw insert in the form of a collar 65 having an internal female screw-threaded surface is fixedly received within screw ram reception channel 60 preferably by being press fitted therein which female screw-threaded surface is complimentary to the external male screw-threaded surface on screw shaft 62.

First frame riser portion 56 includes a rectangular shaped upper portion 70 and an integral enlarged circular shaped bottom portion 72 substantially as illustrated. Protruding inwardly from the bottom circular portion is a first rectangular shaped clamp wing 74 having a first cylindrical or curved clamping surface 76 the imaginary axis of which is substantially parallel to the imaginary central axis defined by screw reception channel 60. The circular shaped bottom portion 72 includes a first aperture 78 and a second aperture 80. In the folded condition of the frame clamp (FIGS. 6–9), first aperture 78 has an imaginary axis orthogonal to the imaginary axis of screw reception channel 60 and second aperture 80 has an imaginary axis orthogonal to the imaginary axis of screw reception channel 60 with the axes of the first and second apertures being spaced laterally from the imaginary central axis defined by circular shaped bottom portion 72 such that the axes of these apertures straddle the first rectangular shaped clamp wing 74. A second screw insert in the form of a collar 82 having an internal female screw-threaded surface is fixedly received within second aperture 80 as by press fitting therein.

Second frame riser portion 58 includes a rectangular shaped upper portion 84 and an integral enlarged circular shaped bottom portion 86 substantially as illustrated. Protruding inwardly from the bottom circular portion is a second rectangular shaped clamp wing 88 having a second cylindrical or curved clamping surface 90, the imaginary axis of which is substantially parallel to the imaginary central axis defined by screw reception channel 60. The circular shaped bottom portion 86 includes a third aperture 92 and a fourth aperture 94. In the folded condition of the frame clamp (FIGS. 6–9), third aperture 92 has an imaginary axis orthogonal to the imaginary axis of screw reception channel 60 and fourth aperture 94 has an imaginary axis orthogonal to the imaginary axis of screw reception channel 60 with the axes of the third and fourth apertures being spaced laterally from the imaginary central axis defined by circular shaped bottom portion 86 such that the axes of the third and fourth apertures respectively straddle the second rectangular shaped clamp wing 88. A third screw insert in the form of a collar 96 having an internal female screw-threaded surface is fixedly received within fourth aperture 94 as by press fitting therein.

When in the assembled, folded, operative position (FIGS. 6–9), the first aperture 78 is in axial alignment with the fourth aperture 94 whereas the second aperture 80 is in axial alignment with the third aperture 92. A first threaded clamp screw is received in the aligned first and fourth apertures 78, 96 and includes a threaded clamp screw shaft portion 104 and a clamp screw handle portion 106 for axially advancing and backing-off the clamp screw shaft portion 100. A second threaded clamp screw is received in the aligned second and third apertures 80 and 92 and includes a threaded clamp screw shaft portion 100 and a clamp screw handle portion 102 for axially advancing and backing-off the clamp screw shaft portion 104. The threaded clamp screw shaft portion 104 of the first threaded clamp screw extends through aperture 78 and matingly engages the third screw insert (collar 96) having an internal female screw-threaded surface whereas the threaded clamp screw shaft portion 100 of the second threaded clamp screw extends through aperture 92 and matingly engages the second screw insert (collar 82) having an internal female screw-threaded surface.

Hence, by tightening the first and second clamp screws, the confronting clamp wings 74 and 88 may be compressed against the tip of pool cue stick 44 (broken lines, FIG. 8) to thereby maintain the end of the stick in position so that subsequent tightening of the screw ram will apply an appropriate axial force on the cue tip placed on the end of pool cue stick 44. Similarly, by loosening the first and second clamp screws and slightly flexing the first and second riser portions outwardly, the pool cue stick with its installed cue tip easily may be withdrawn from the apparatus along the direction of the imaginary axis defined by threaded screw shaft 62.

From the foregoing, it will be appreciated that an important feature of the alternatively preferred embodiment of FIGS. 6–9 is the ability of the first and second frame riser portions to flex laterally relative to the frame top portion, such flexural displacement being indicated by arrows 108 in FIG. 10. More specifically, in accordance with the alternatively preferred embodiment of the invention, the first and second frame riser portions are attached to the top frame portion by necked-down sections 110 and 112 which latter define flexure or hinge axes extending perpendicular to a horizontal imaginary plane passing through the frame top portion as viewed in FIG. 10. Thus, necked-down sections 110 and 112 permit flexural displacement of the first and second frame riser portions relative to frame top portion from an unfolded condition (solid) lines to a folded condition (broken lines) as viewed in FIG. 10. When the clamp frame is molded from a suitable thermoplastic material as preferred, the necked-down sections 110 and 112 define so-called "living hinges."

Figure 6:
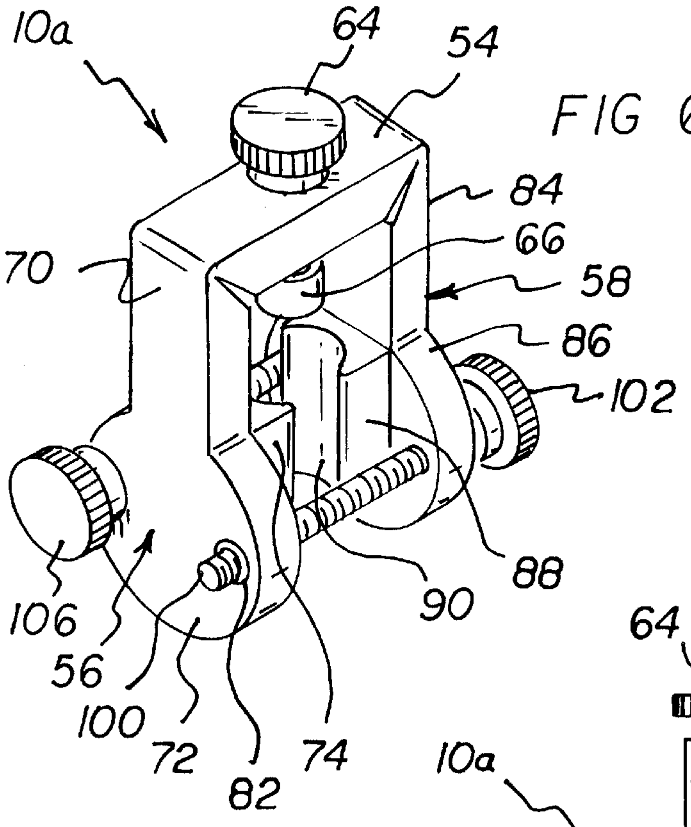
FIG. 6 is a perspective view showing an alternatively preferred embodiment of the cue tip installation apparatus of the invention.
Figure 7:
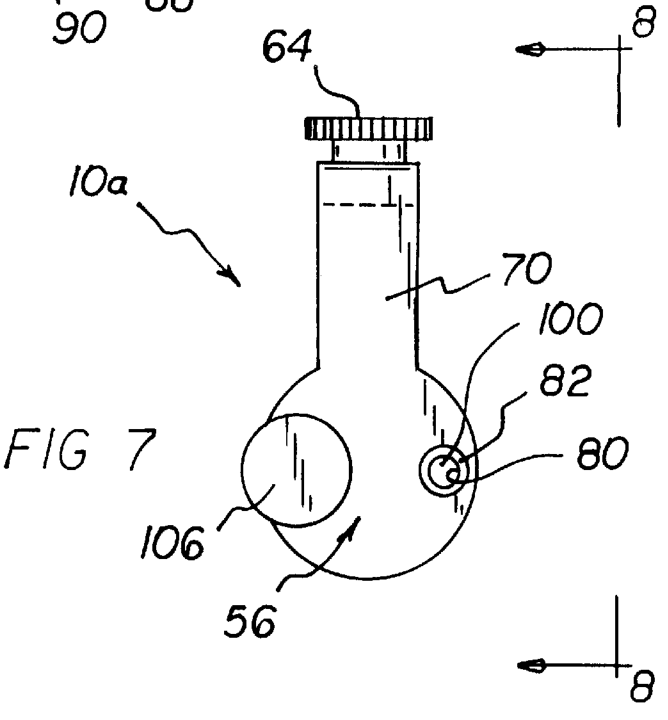
FIG. 7 is a side view of the alternatively preferred embodiment of the cue tip installation apparatus shown in FIG. 6.

To assemble the clamp frame of FIGS. 6–11, the screw threaded screw shaft 62 is mated with first insert 65 in the screw ram reception channel 60 and the cue tip compression head 66 is suitably attached to the distal end of screw shaft 62 (see previous embodiment). The first and second frame riser portions then are flexed relative to frame top portion from an unfolded condition to a folded condition and the first and second clamp screws are inserted into the aligned first and fourth apertures and second and third apertures, respectively, to produce the assembly illustrated in FIGS. 6–9. In use, the apparatus is employed as in the prior described embodiment with the exception that the cue tip end of the pool cue 44 is clamped between the curved clamping surfaces 76 and 90 of the rectangular shaped clamp wings 76 and 88 by suitable operation of the first and second clamp screws 100, 104 which straddle the rectangular shaped clamp wings 74 and 88 substantially as illustrated. The clamp wings and the first and second clamp screws thus define a reception channel for receiving an end of a pool cue stick along the imaginary axis defined by threaded screw shaft 62 (FIGS. 6, 8 and 9).

The clamp frame of the alternatively preferred embodiment may advantageously be formed of a material selected from the group comprising thermoplastic polymers using conventional plastic fabrication methods such as injection molding. Polypropylene or polyethylene are mostly preferred materials selected from this group. The first, second and third inserts preferably are fabricated of a durable hard metal with brass being mostly preferred. The screw ram and the clamp screws may be metal or plastic. By permitting the first and second riser portions to flex relative to the top riser portion, easy removable of a pool cue after the tip is installed thereon is facilitated, and an extremely compact and lightweight apparatus is achieved.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved cue tip installation apparatus that is low in cost, relatively simple in design and operation, and which may advantageously be used to install a cue tip onto a cue stick without employing slide compression. With the invention, a cue tip installation apparatus is provided which can be employed for installing different size and different weight cue tips. With the invention, a cue tip installation apparatus is provided which maintains installation components in proper alignment during the installation process. With the invention, a cue tip installation apparatus is provided which can be attached to a stable support and can be used during attachment to the stable support. With an alternatively preferred embodiment of the present invention, a compact lightweight apparatus is achieved, facilitating easy removal of a pool cue stick after tip installation is completed.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. Apparatus for installing a cue tip on an end of a pool cue stick, said apparatus comprising:

frame means, said frame means having a reception channel for receiving an end of a pool cue stick along a first axis, clamping means on said frame means for affixing said end of said pool cue stick received in said reception channel to said frame means, and ram means for applying a compressive force to the end of said pool cue stick along said first axis, and wherein said frame means is substantially U-shaped.

2. The apparatus of claim 1 wherein said clamping means includes means for engaging said end of said pool cue stick received in said reception channel along a second axis substantially perpendicular to said first axis.

3. The apparatus of claim 2 wherein said frame means includes a top portion and at least one riser portion attached to said top portion, said ram means being connected to said top portion and said clamping means being connected to said riser portion.

4. The apparatus of claim 3 wherein said ram means includes a ram screw rotatably translatable along said first axis, and said frame means top portion includes a ram screw reception channel for receivably engaging said ram screw therein.

5. The apparatus of claim 4 wherein said ram screw includes a first end and a second opposed end, handle means attached to said first end, and pool cue stick compression head means attached to said second opposed end.

6. The apparatus of claim 3 wherein said clamping means includes a pair of clamp wings attached to said at least one riser portion, said pair of clamp wings defining said reception channel for receiving an end of a pool cue stick along a first axis, and wing clamp means for clamping said clamp wings together.

7. The apparatus of claim 6 wherein said pair of clamp wings includes clamp screw reception channels oriented substantially parallel to said second axis, and said wing clamp means includes a clamp screw received in said clamp screw reception channels.

8. The apparatus of claim 7 wherein said clamp screw includes a threaded clamp screw shaft portion and a clamp screw handle portion for driving said clamp screw shaft portion.

9. The apparatus of claim 3 wherein said frame means includes a top portion having first and second ends, first and second riser portions attached to said top portion first and second ends, respectively, and wherein said clamping means includes a pair of clamp wings attached to said first and second riser portions, respectively, said pair of clamp wings defining said reception channel for receiving an end of a pool cue stick along a first axis, and wing clamp means for clamping said clamp wings together.

10. Apparatus for installing a cue tip on an end of a pool cue stick, said apparatus comprising:

frame means, said frame means having a reception channel for receiving an end of a pool cue stick along a first axis, clamping means on said frame means for affixing said end of said pool cue stick received in said reception channel to said frame means, and ram means for applying a compressive force to the end of said pool cue stick along said first axis, wherein said clamping means includes means for engaging said end of said pool cue stick received in said reception channel along a second axis substantially perpendicular to said first axis, wherein said frame means includes a top portion and at least one riser portion attached to said top portion, said ram means being connected to said top portion and said clamping means being connected to said riser portion, wherein said frame means includes a top portion having first and second ends, first and second riser portions attached to said top portion first and second ends, respectively, and wherein said clamping means includes a pair of clamp wings attached to said first and second riser portions, respectively, said pair of clamp wings defining said reception channel for receiving an end of a pool cue stick along a first axis, and wing clamp means for clamping said clamp wings together, and wherein said pair of clamp wings includes first and second clamp screw reception channels oriented substantially parallel to said second axis, and said wing clamp means includes first and second clamp screws received in said clamp screw reception channels, respectively.

11. The apparatus of claim 10 wherein said clamp screws each includes a threaded clamp screw shaft portion and a clamp screw handle portion for driving said clamp screw shaft portion.

12. Apparatus for installing a cue tip on an end of a pool cue stick, said apparatus comprising:

frame means, said frame means having a reception channel for receiving an end of a pool cue stick along a first axis, clamping means on said frame means for affixing said end of said pool cue stick received in said reception channel to said frame means, and ram means for applying a compressive force to the end of said pool cue stick along said first axis, wherein said clamping means includes means for engaging said end of said pool cue stick received in said reception channel along a second axis substantially perpendicular to said first axis, wherein said frame means includes a top portion and at least one riser portion attached to said top portion, said ram means being connected to said top portion and said clamping means being connected to said riser portion, wherein said frame means includes a top portion having first and second ends, first and second riser portions attached to said top portion first and second ends, respectively, and wherein said clamping means includes a pair of clamp wings attached to said first and second riser portions, respectively, said pair of clamp wings defining said reception channel for receiving an end of a pool cue stick along a first axis, and wing clamp means for clamping said clamp wings together, and wherein said first riser portion has a first end and a second end, said first end being hingedly connected to said first end of said frame means top portion.

13. The apparatus of claim 12 wherein said second riser portion has a first end and a second end, said first end being hingedly connected to said second end of said frame means top portion.

14. Apparatus for installing a cue tip on an end of a pool cue stick, said apparatus comprising:

frame means, said frame means having a reception channel for receiving an end of a pool cue stick along a first axis, clamping means on said frame means for affixing said end of said pool cue stick received in said reception channel to said frame means, and ram means for applying a compressive force to the end of said pool cue stick along said first axis, wherein said clamping means includes means for engaging said end of said pool cue stick received in said reception channel along a second axis substantially perpendicular to said first axis, wherein said frame means includes a top portion and at least one riser portion attached to said top portion, said ram means being connected to said top portion and said clamping means being connected to said riser portion, wherein said frame means includes a top portion having first and second ends, first and second riser portions attached to said top portion first and second ends, respectively, wherein said clamping means includes a pair of clamp wings attached to said first and second riser portions, respectively, said pair of clamp wings defining said reception channel for receiving an end of a pool cue stick along a first axis, and wing clamp means for clamping said clamp wings together, wherein said pair of clamp wings includes first and second clamp screw reception channels oriented substantially parallel to said second axis, said wing clamp means includes first and second clamp screws received in said clamp screw reception channels, respectively, and wherein said first and second clamp screw reception channels straddle said pair of clamp wings.

15. The apparatus of claim 14 wherein said first riser portion has a first end and a second end, said first end being hingedly connected to said first end of said frame means top portion, and wherein said second riser portion has a first end and a second end, said first end being hingedly connected to said second end of said frame means top portion.

16. The apparatus of claim 14 wherein said first clamp screw reception channel extends through said first riser second end and said second riser second end, and wherein said second clamp screw reception channel extends through said first riser second end and said second riser second end.

* * * * *